Patented June 15, 1954

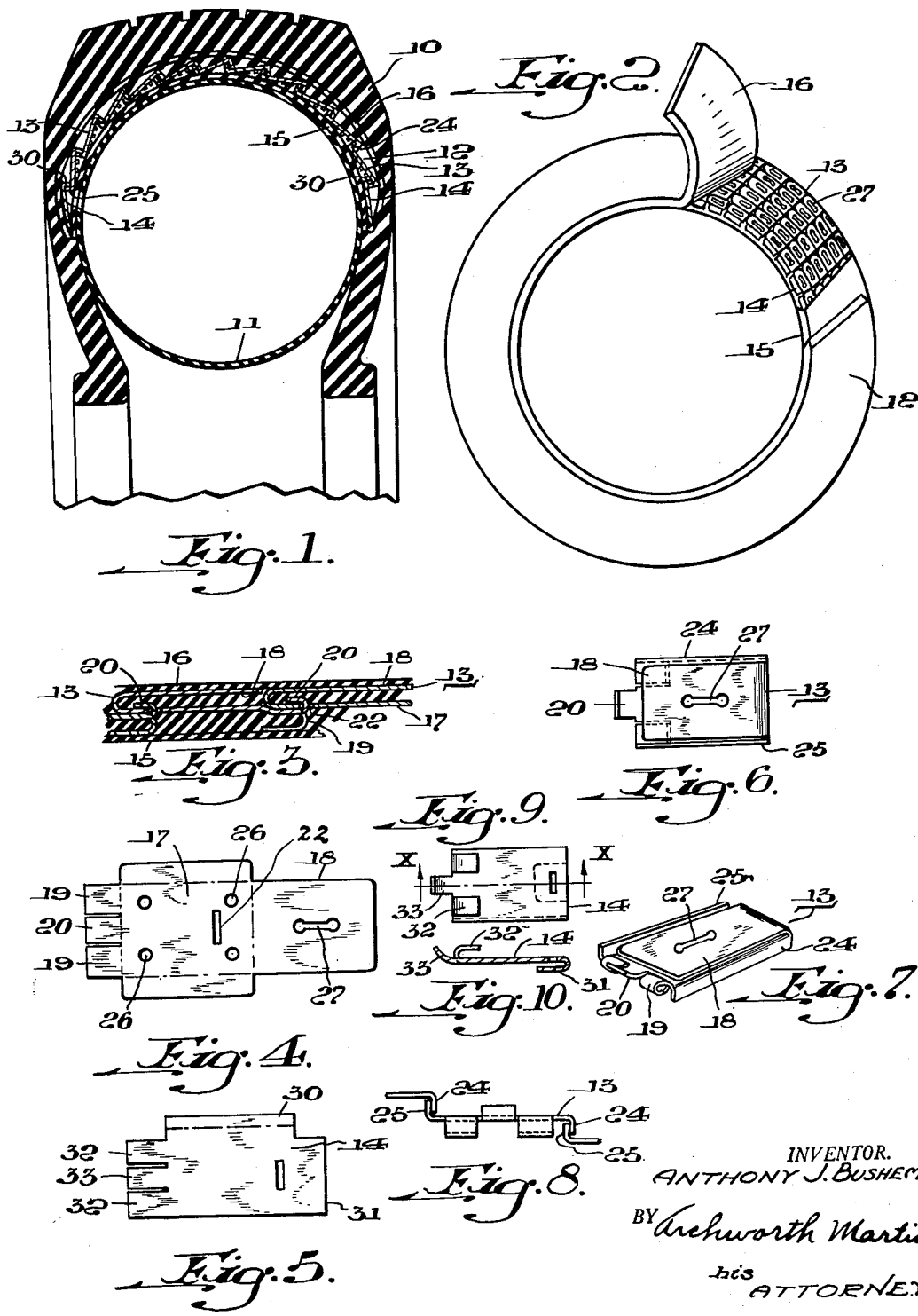

2,681,093

UNITED STATES PATENT OFFICE 2,681,093

ARMOR GUARD FOR PNEUMATIC TIRES

Anthony J. Bushemi, Pittsburgh, Pa.

Application June 10, 1953, Serial No. 360,805

2 Claims. (Cl. 152—206)

My invention relates to armor guards for pneumatic tires, and more particularly to those devices wherein metal plates are used to prevent punctures, the armor guard being placed between the tire shoe and the inner tube.

One object of my invention is to provide an armored structure of puncture-proof plates so arranged that notwithstanding the fact that the armor is more highly flexible than various armor structures of this type heretofore employed, there are no openings at the joints between the plates or elsewhere, through which tire-puncturing nails or the like may enter.

Another object of my invention is to provide armor guard plates held in unitary relation so that they may conveniently be placed between an inner tube and its tire, and so arranged that they are more highly flexible than devices of similar nature heretofore employed, in that they have hinge-like or pivotal connection for movements relative to one another in three directions, namely on axes tangential to the tire; on axes that are generally radial to the tire, and on axes that extend transversely of the tire tread.

As shown in the accompanying drawing,

Figure 1 is a cross sectional view of a tire, showing the manner in which my puncture-proof device is assembled therein;

Fig. 2 is a perspective view of my armor, with the puncture-proof plates partly exposed;

Fig. 3 is an enlarged sectional view through some of the puncture-proof plates showing the manner in which they are imbedded in the rubber layers of Fig. 2;

Fig. 4 is a plan view of a blank before bending it to its finished form;

Fig. 5 shows a blank for a marginal plate;

Fig. 6 is a plan view of the blank of Fig. 4 bent to approximately its finished shape;

Fig. 7 is a perspective view of the blank of Fig. 4 bent to approximately its finished shape;

Fig. 8 is a view crosswise of the device, showing the manner in which the plates 13 are hooked together; along their longitudinal edges;

Fig. 9 is a plan view of the blank of Fig. 5 bent to approximately its completed shape, and Fig. 10 is a view on the line X—X of Fig. 9.

As shown in Fig. 1, the tire or shoe 10 and the inner tube 11 may be of various standard forms, and my armor or guard can be used with various sizes and types of tires, interchangeably. An armor or guard 12 formed of metal plates 13 and 14 are hooked together before applying inner and outer layers 15 and 16 of unvulcanized rubber against them and placing the assembled members into a heated mold for vulcanizing under pressure, the soft rubber entering into the plate holes and crevices and imbedding the plates.

The plates 13 have body portions 17 (Fig. 4); a flap-like portion 18; lip portions 19, and a tongue 20.

The flap-like extension 18 is bent backwardly on to the body portion 17, mainly in spaced relation thereto, so as to permit entry of rubber between these members when the tire assembly is being vulcanized under pressure in a mold. The lips 19 are bent inwardly into loosely underlying relation to the body 17 for imbedment in the rubber, as shown in Fig. 3, while the tongue 20 is bent outwardly to form a hook for link connection with a slot 22 in the next adjacent plate. In this manner, the plates have hinge-like connection with one another for pivotal movement about axes transverse to the tire tread. Also, there is sufficient looseness that they can have swinging movement relative to one another about axes perpendicular to the body portions of the plates. The bends at 19 are such that they will partly underlie the next succeeding plate, as shown in Fig. 3, so that there is no space between the plates at those areas for entry of nails in a perpendicular direction. The hooks at 20 serve to connect the plates in chain arrangement.

The longitudinal edges of the body portions 17 of the plates are bent inwardly and outwardly. as shown at 24 and 25 respectively, to form hooked engagement with one another as shown more clearly in Figs. 1 and 8. This arrangement not only provides for relative tilting of the plates about axes tangential to the tire, but form complete closures at the edges of the circumferential rows of plates and thereby prevent entry of nails or other puncturing elements into the inner area of the tire.

The plates 13 have holes and slots formed therein as shown at 26 and 27 through which the soft rubber may flow to more effectively imbed the plates so that the rubber from the inner layer 15 can stitch with the plate and the rubber of the layer 16. Some of the rubber from these two layers will fill the spaces between 17 and the bent-back portions 18 and 19, as well as imbedding the plates otherwise.

The two marginal rows of plates 14 (Fig. 5) each has only one edge 30 of its body portion bent to form a flange for hooked engagement with the flanges at 24 and 25. These plates 14 are otherwise formed and interconnected substantially the same as are the plates 14, their members 31, 32 and 33 corresponding to the members 18, 19 and 20 of Figs. 3, 4 and 6.

I claim as my invention:

1. An armor for vehicle tires of rubber, comprising plates having body portions of generally rectangular form, with their edges bent in opposite directions for interconnection of the plates with one another, a flap-like extension on one end of each plate bent outwardly and backwardly in spaced relation thereto, a pair of lips on the other end of each said plate bent backwardly and inwardly in spaced relation to the body portion, a tongue between the lips and bent outwardly to hook form, and a slot in the body portion of each said plate whereby they can be engaged by a hook of an adjacent plate.

2. An armor for vehicle tires of rubber, comprising plates having body portions of generally rectangular form, with their edges bent in opposite directions for interconnection of the plates with one another, a flap-like extension on one end of each plate bent outwardly and backwardly in spaced relation thereto, a pair of lips on the other end of each said plate bent backwardly and inwardly in spaced relation to the body portion, a tongue between the lips and bent outwardly to hook form, and a slot in the body portion of each said plate whereby they can be engaged by a hook of an adjacent plate, there being holes through the body portion and the bent-back flap portion, for the intrusion of plastic material.

References Cited in the file of this patent

UNITED STATES PATENTS

| Number | Name | Date |
|---|---|---|
| 1,168,674 | Reuter | Jan. 18, 1916 |
| 1,177,930 | Cohrs | Apr. 4, 1916 |
| 1,413,619 | Sawicki | Apr. 25, 1922 |

FOREIGN PATENTS

| Number | Country | Date |
|---|---|---|
| 281,501 | Great Britain | Dec. 8, 1927 |